United States Patent [19]

Repton et al.

[11] 3,814,919

[45] June 4, 1974

[54] FAULT DETECTION AND ISOLATION IN A DATA PROCESSING SYSTEM

[75] Inventors: Charles Samuel Repton, Wooburn Green; Peter Charles Venton; Kenneth James Hamer Hodges, both of Wimborne, Dorset, all of England

[73] Assignee: Plessey Handel und Investment A.G., Zug, Switzerland

[22] Filed: Mar. 1, 1972

[21] Appl. No.: 232,463

[30] Foreign Application Priority Data

Mar. 4, 1971 Great Britain ...................... 5994/71

[52] U.S. Cl. ....................... 235/153 AK, 340/172.5
[51] Int. Cl. ............................................ G06f 11/04
[58] Field of Search ............ 235/153 AK; 340/172.5

[56] References Cited

UNITED STATES PATENTS

| | | | |
|---|---|---|---|
| 3,201,760 | 8/1965 | Schimpf | 235/153 AK X |
| 3,286,239 | 11/1966 | Thompson et al. | 340/172.5 |
| 3,387,276 | 6/1968 | Reichow | 340/172.5 |
| 3,517,171 | 6/1970 | Avizienis | 235/153 AK |
| 3,599,179 | 8/1971 | Arnold | 340/172.5 |
| 3,692,989 | 9/1972 | Kandiew | 235/153 AK |

*Primary Examiner*—Malcolm A. Morrison
*Assistant Examiner*—David H. Malzahn
*Attorney, Agent, or Firm*—Blum, Moscovitz, Friedman & Kaplan

[57] ABSTRACT

A fault interrupt system is arranged, upon the detection of a fault to cause a processor in which the fault is detected to enter a fault check-out routine. Successive fault conditions detected while performing the fault check-out routine causes re-entry into that routine. A faulty processor is therefore, trapped within the fault check-out routine. Additionally the detection of a fault causes the master capability register of the fault detecting processor to be overwritten with a capability defining a special capability table which is only relevant to the fault check-out programs. By this mechanism the faulty processor cannot, even under fault conditions, gain access to any storage areas outside those of the fault check-out programs. In the multi-processor/multi-storage module system of the PP250 a number of copies of the fault check-out programs and related workspace areas on a one copy per store module basis are provided together with a special capability pointer for each processor of the system and each entry into the check-out program is performed using a different store and therefore entry mechanism into the check-out programs copy so that intermittent processor faults or particular storage module faults will not maintain the processor indefinitely in the check-out program.

7 Claims, 7 Drawing Figures

FAULT DETECTION AND ISOLATION IN A DATA PROCESSING SYSTEM

The present invention relates to fault detection and handling arrangements for use in real-time data processing systems and is more particularly although not exclusively concerned with the use of such arrangements in so-called multi-processor systems.

In real-time processor environments, such as multiprocessor controlled telecommunication systems, it is vital to ensure that malfunctioning of one of the processor equipments is detected and compensated for as soon as possible. Both hardware and so-called "software" (programming errors) faults must be detected and acted upon, however it is reasonable to suppose that the majority of software faults will be removed before the processor system becomes operational by the incorporation of thorough and comprehensive testing of the application and supervisor programs of the system prior to its operational cut-over. Those software faults which remain when the system becomes operational must be handled, when detected, as for solid and transient hardware faults.

In many prior art systems the detection of a fault simply causes the equipment in which the fault has been detected to be rejected (i.e., placed off-line) from the on-line system. Hardware faults, however, may be classified as "solid" or "transient" and it is commonly accepted that significantly more transient faults than solid faults occur and indeed the ratio of transient to solid faults may be of the order of some five transient to one solid fault. The simple rejection of a faulty equipment from the operational system has the immediate effect of reducing the operational security of the remaining system by the removal of part or even all of its "fail safe" redundancy. This is particularly relevant in so-called multi-processor systems where the removal of one of the processors severely restricts the spare capacity of the processor system. The rejection of the faulty equipment leaves the operational system in a critical state until some reconfiguration mechanism is activated to replace the faulty equipment by a spare equipment.

Upon detection of a fault it is vital in any multiprocessor system to ensure that the effects of the fault do not spread throughout the rest of the data processing system. The effects of the fault must be confined to as limited an area as possible so that correctly functioning equipment is not corrupted by the effects of the fault. It is therefore an object of the present invention to confine the functions of a faulty device to those functions which will be harmless to the rest of the online system when a fault is detected.

According to the invention there is provided a data processing system including a memory and at least one processor module, said memory providing storage for information relative to application and supervisory programs together with information relative to a fault check-out program characterised in that the processor module is provided with fault detection and handling means arranged upon detection of a fault condition to become immediately operative within the processor module to restrict the area of access permitted to said memory to that in which the information relative to said fault check-out program resides.

As stated above all hardware faults fall into one of two categories (i.e., solid or transient) and therefore the detection of a fault on many occasions will leave the system in a critical state if the equipment (processor) in which the fault condition has been detected is immediately removed from the on-line system although the actual fault which had occurred could have been transient. It is therefore a further object of the invention to provide a fault interrupt mechanism for use in a data processing system which is arranged to discriminate between solid and transient faults.

According to an aspect of the invention there is provided an on-line data processing system including a memory having a plurality of storage modules and at least one processor module, said memory providing storage for information relative to application and supervisory programs together with a fault check-out program characterised in that a multiplicity of fault check-out program entry segments are provided each holding information defining a segment holding information relative to memory areas holding information relative to said fault check-out program and each of said entry segments is stored in a different one of said memory modules and a processor module is provided with fault detection means arranged upon detection of a fault condition to become immediately operative within the processor module to suspend said processor module from said on-line system by preventing access to the information relative to said application and supervisor programs and to use one of said entry segments to enter said fault check-out program to check-out all the functional operations of said processor module and if a further fault is detected when performing said fault check-out program said fault detection means is arranged to cause said processor module to use another of said entry segments to re-enter said fault check-out program whereas if said fault check-out program is successfully performed said processor module is restored to said on-line system.

By the use of the above arrangements of the invention a faulty processor can be contained within an infinite loop using progressively all the fault check-out program entry segments in turn. However, if the original fault had been transient the processor will subsequently complete check-out and apply to re-enter the on-line system. Additionally a fault in a storage module which may manifest itself as a processor module fault will not maintain the processor module off-line as the check-out procedure will be eventually successful using another entry segment and check-out program copy in a storage module other than that which is faulty.

The invention has particular, although not exclusive, application to data processing systems incorporating memory protection systems typically of the type disclosed in our copening U.S. application Ser. No. 146,334 filed May 24, 1971. In such systems a plurality of so-called "capability" registers are provided in a processor module each of which is arranged to hold a segment descriptor defining the base and limit addresses of a particular segment of information in the system's memory. Two sets of such capability registers are used in the processor module described in copending U.S. application Ser. No. 146,334, filed May 24, 1971, one set being so-called "work-space" capability registers whereas the other set are so-called "hidden" capability registers.

The work-space capability registers are used to hold segment descriptors which define some of the working areas of the memory to which the program currently being executed by the processor module is allowed access. All memory accesses are relative to the base address of a selected one of the capability registers and the actual access address is checked to ensure that it lies within the segment defined by that capability register. Additionally arrangements are provided to ensure that the type of access required is currently permitted.

The hidden capability registers hold segment descriptors which define administration segment areas in the memory used for example on dumping and interrupt operations. One of the hidden capability registers is a so-called master capability register referred to as MCR in copending U.S. Pat. application Ser. No. 146,334, filed May 24, 1971. The master capability register is arranged, under normal working conditions, to hold a segment descriptor which defines a so-called master capability table held in the memory. The master capability table consists of a list of entries one for each information segment of the memory. Each entry consists of the base and limit addresses of a memory segment and the master capability table has a corresponding entry for each segment of information for all the programs of the system in the memory.

According to a preferred embodiment of the invention the processor module includes a special register holding information defining one of said entry segments and each of said entry segments includes information relative to a segment descriptor defining a special capability table and said fault detection means are arranged upon detection of a fault condition to replace the contents of the master capability register with the segment descriptor defining said special capability table, said special capability table comprising a number of entries one for each segment of information relative to said check-out program alone.

By the provision of the special register the master capability register, which is used on all work-space capability register loading operations, is loaded with a segment descriptor defining a special capability table as soon as a fault is detected. The special capability table has information relating to a very limited sub-set of the system programs typically only those segments relative to the fault check-out program alone. Hence the above arrangements have the effect of ensuring that the faulty processor module has its memory access abilities restricted to the areas of the memory in which the fault check-out program resides as soon as a fault condition is detected. The segments relative to all the other programs (i.e., applications and supervisor) cannot be accessed by the faulty processor module because of the memory protection arrangements provided by the capability register structure; therefore while the processor is performing the fault check-out program, corruption of those segments cannot occur. The fault check-out program is arranged to routine and test all the operations of the processor module and if it is completed successfully exit from this program may be to a "start-up" supervisor program allowing the nominally faulty processor which has been suspended from the on-line system to rejoin that system. Hence a processor module which was subjected to a transient fault will not be prematurely rejected from the system. However if a solid fault had occurred the processor module will be confined harmlessly in the fault check-out loop previously referred to.

The invention, together with its features, will be more readily understood from the following description of one embodiment of the invention which should be read in conjunction with the accompanying drawings.

Of the drawings:

FIG. 1 shows a block diagram of a typical so-called multi-processor data processing system in which a processor module incorporating the invention may be employed.

FIG. 2*a* and 2*b* shows a block diagram of a processor module incorporating one embodiment of the invention.

FIG. 5 shows a flow diagram of the operation performed in response to the detection of a fault condition in accordance with the specific embodiment of the invention while

GENERAL DESCRIPTION

Figure 1:
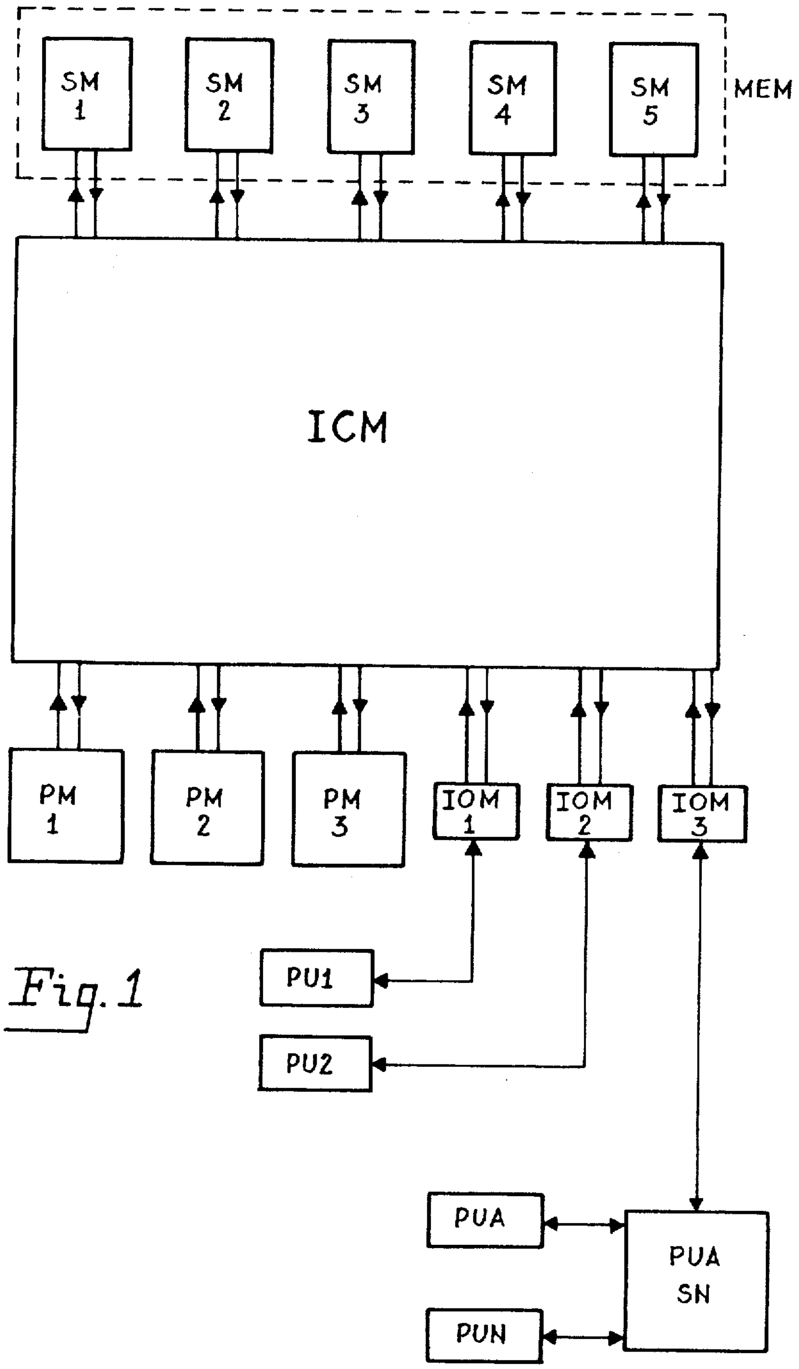

Referring firstly to FIG. 1 brief consideration will be given to a typical multi-processor data processing system organized on a modular basis. The system consists typically of a memory MEM, including a number of storage modules SM1 to SM5, a number of processor modules PM1 to PM3 and a number of input-output modules IOM1 to IOM3, which serve the peripheral units PU1, PU2 and PUA to PUN, together with an intercommunication medium ICM for memory to processor/input-output module intercommunication. The actual quantities of the various modules shown in FIG. 1 is typical only and they are not intended to be limiting to the present invention in any way. The input-output modules IOM1 to IOM3 may be arranged to serve a single peripheral unit (such as PU1) or by way of a peripheral unit access switching network PUASN a plurality of peripheral units (such as PUA to PUN) on a time-sharing basis.

Each processor module may be connected by the intercommunication medium ICM to any of the storage modules SM1 – 5 and the memory MEM provides storage for all the application and supervisory programs and working and permanent data therefor. While performing a program a processor module is arranged to extend a demand to the intercommunication medium ICM indicative of the memory address required and the intercommunication medium time-shares the access demands to the various storage modules. The input-output modules IOM1 to IOM3 are also able to gain access to the memory for the interchange of information between particular memory areas and the peripheral units.

In a modular data processing system to which the invention is particularly, although not exclusively, related the memory is arranged on a segmented basis. All the program data, and the working and permanent data therefor, is distributed in segmented form amongst the various storage modules of the system. Each processor is provided with a plurality of so-called capability registers each arranged to hold a so-called segment descriptor defining a segment to which the processor requires access in the performance of the currently allocated program. Such an arrangement as already stated is described in our copending U.S. Pat. application Ser. No. 146,334, filed May 24, 1971. Two of the capability registers in such a processor module are used to hold segment descriptors defining a so-called master capability table and a so-called reserved segment pointer table respectively. The master capability table has one entry for each segment in the memory and each entry includes information defining the base and limit addresses of the segment to which it relates. Thus the master capability table provides information on the location within the memory for each information segment for all the programs and working and permanent data for the system. Obviously some of the information segments will be common to a number of programs while others will be particular to specific programs. Each program is provided with a list of segments to which it requires and can be allowed access and this list consists of a series of pointers relative to the master capability table which are stored in a reserved segment pointer table associated with each program. The segment descriptor defining the program's reserved segment pointer table is loaded into one of the capability registers of a processor module each time that processor module commences performance of the particular program. The capability registers of a processor module are divided into two groups, one for administration purposes (including the master capability table register) and the second for current working program use. The second group of registers are called workspace capability registers and are used to hole segment descriptors defining segments which are to be used in the execution of the current program. For economy purposes there are considerably less workspace capability registers provided in a processor module than there are locations in the reserved segment pointer table and the processor modules are provided with a "load capability register" instruction. This instruction uses the reserved segment pointer table for the current program and the master capability table to derive from the master capability table a segment descriptor for the program as required in its execution.

A capability register is used each time a memory access operation is required. The base address of a particular instruction word defined capability register is added to the instruction word defined address to define the absolute address of a particular location within the required segment. The address for each store access is checked to ensure that it lies within the bounds of the required segment (i.e., store absolute address $\geq$ defined segment base address and $\leq$ defined segment limit address) before memory accesses is permitted. If either of the above conditions do not occur a fault condition is immediately indicated.

It was stated above that circumstances will arise where segments are common to a number of programs and certain programs may only be permitted to read the information therein while other programs may be permitted to both read and write to those segments. To accommodate this and other circumstances each reserved segment pointer has associated with it a so-called permitted access code defining the access operations permitted by the particular program. The permitted access code is placed in the capability register loaded with the segment descriptor and is used to check that each access to that segment by the processor module is of the permitted type. Again a fault indication is given if an access type violation occurs.

By the provision of the above mechanisms it can be seen that a very secure memory access system may be built into the organisation of a processor module and by the provision of other more normal fault detection mechanisms (such as parity) a processor module may be produced which has a very high degree of internal security. However as mentioned previously many faults which occur are of the transient type and it is one of the aims of the present invention to provide a fault interrupt mechanism which suspends the processor module from the on-line system when a fault occurs but will allow that processor module to return to the on-line system if it passes correctly through a fault check-out process.

For this reason each processor module of the system of FIG. 1, is provided with a fault interrupt mechanism which upon detection of a fault condition causes the segment descriptor in the master capability register to be overwritten with a segment descriptor which defines a special capability table having a very limited number of entries. The segments specified by the special capability table are those which are relevant to a fault check-out program and a system rejoin program. By this arrangement the processor module in which a fault condition has been detected is immediately confined to a limited area of the memory (i.e., that relative to the fault check-out program) and cannot therefore have any destructive effects on the rest of the working on-line system.

The segment descriptor for the special capability table is derived from the memory and each processor is provided with a special capability register which points to a particular area in a so-called fault block. In actuality a plurality of these fault blocks are provided each having an area particular to each processor module in different storage modules together with one copy of the fault check-out program in each storage module having a fault block. The gase address of the area within a fault block for a particular processor is arranged to be the same in each storage module in which it appears and the fault interrupt mechanism and the fault check-out program are arranged in such a manner that if a fault is detected while they are in operation the processor module returns to the start of the fault interrupt sequence using the fault block from another storage module and therefore enters the fault check-out program using another copy thereof. By this arrangement if the fault which occurred was on a particular storage module rather than in the processor module the check-out program could be obeyed using a good storage module after an abortive attempt using the faulty storage module. Additionally if the fault which occurred in the processor module was "solid" the faulty processor will be trapped harmlessly in the fault check-out routine sequentially accessing each storage module in turn in which the fault blocks are held.

Consideration will now be given with reference to FIGS. 2*a*, 2*b*, 3 and 4 to a typical processor module which may incorporate an interrupt mechanism according to the teachings of the invention before embarking upon description of the functioning of one embodiment of the interrupt mechanism of the invention.

PROCESSOR MODULE DESCRIPTION

Figure 2A:
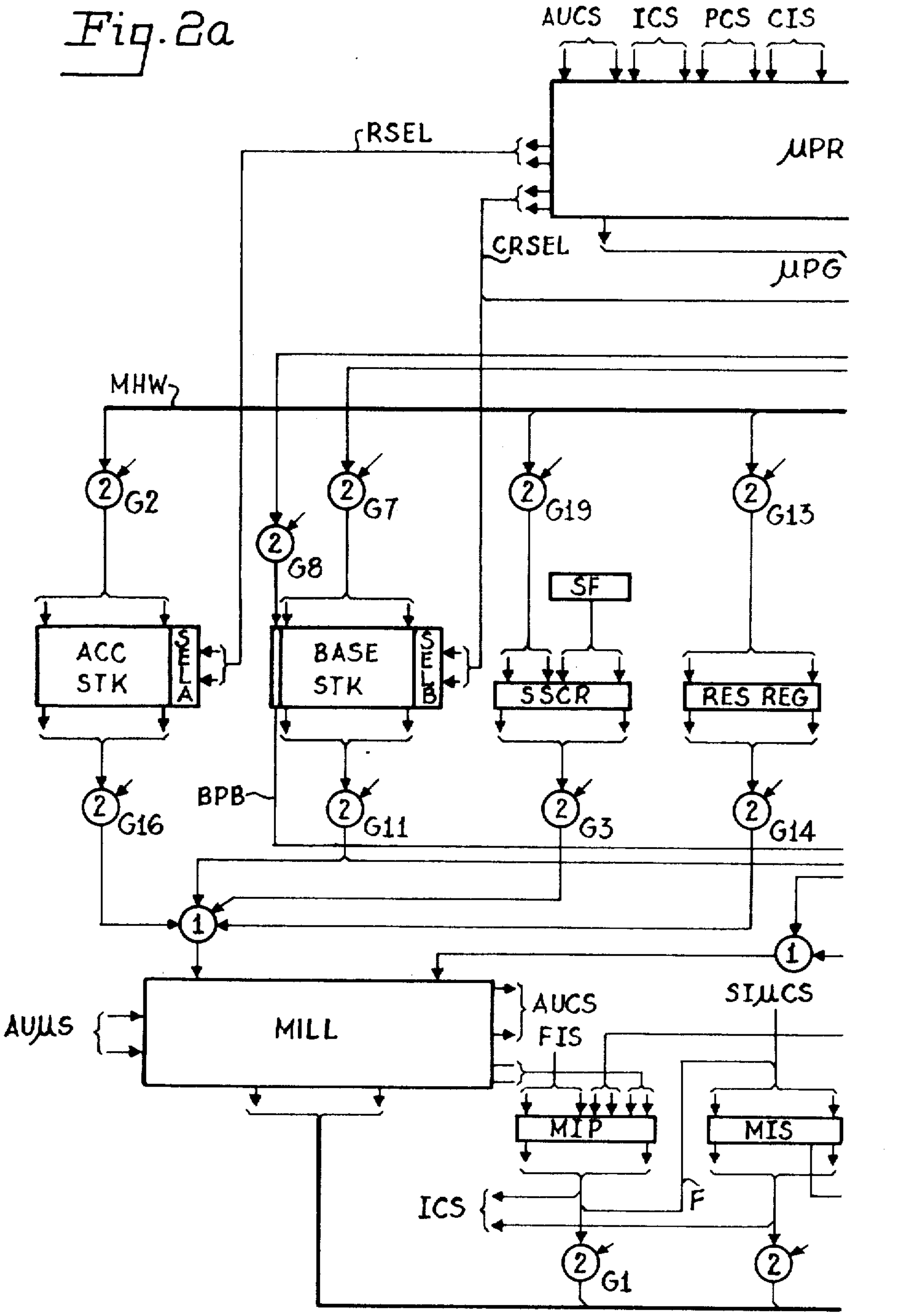
Figure 2B:
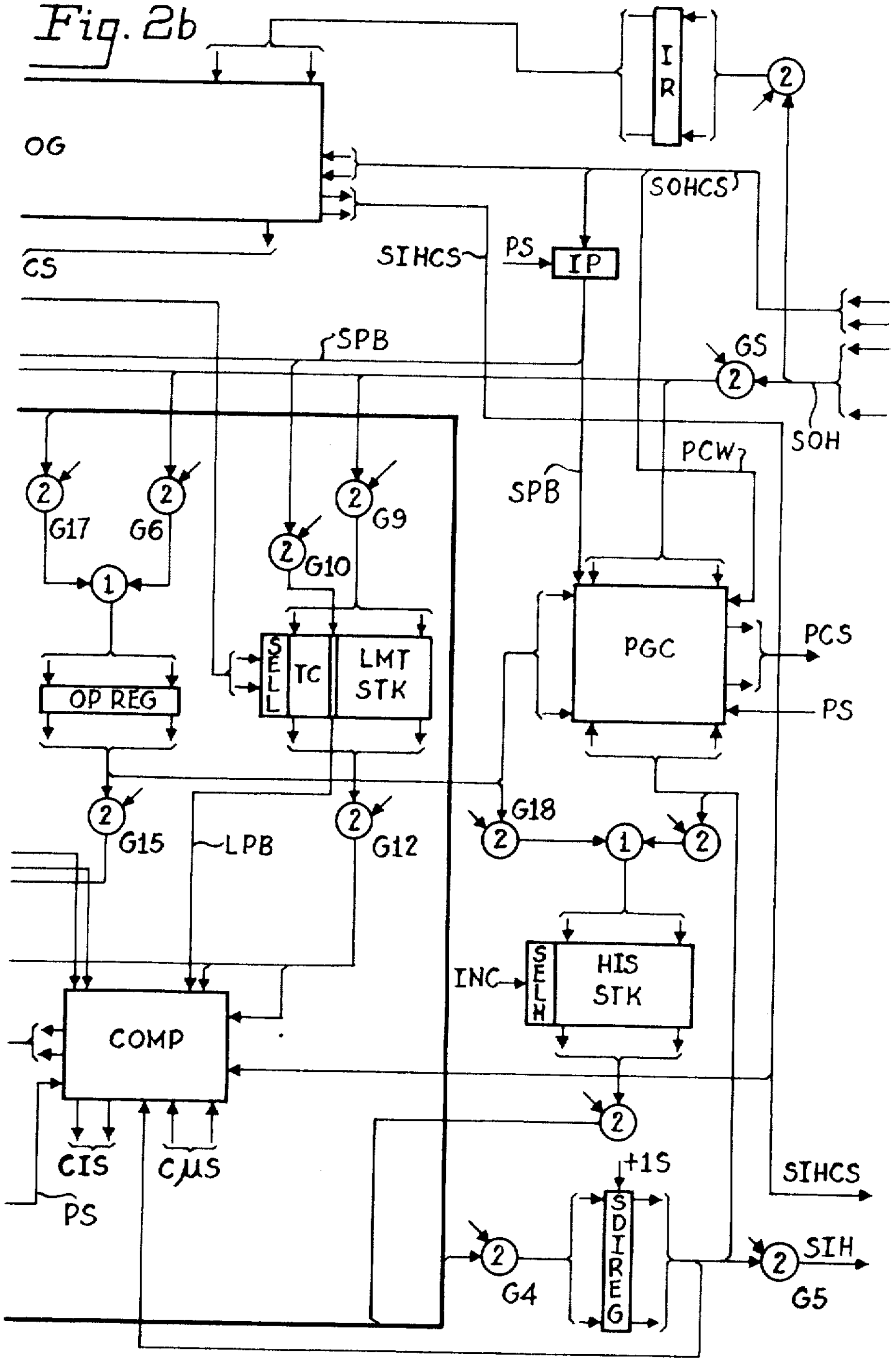

FIGS. 2*a* and 2*b* which should be placed side-by-side with FIG. 2*b* on the right, show the relevant details of a typical processor module which incorporates equipment for the performance of the invention. The processor module CPU consists of an instruction register IR, a register stack of accumulator/working registers ACC STK, a result register RES REG, an operand register OPREG, a mirco-program control unit $\mu$PROG, an arithmetic unit MILL, a data comparator COMP, a memory data input register SDIREG, a pair of memory protection (capability) register stacks BASE STK and TC/LMTSTK, a pair of machine indicator registers MIP and MIS, a so-called historic register stack HIS STK, a parity generation and comparison circuit PGC and a special block capability register SSCR. Typically the four register stacks (ACC STK, BASE STK, TC/LMT STK and HIS STK) may be constructed using so-called scratch-pad units and these scratch-pad units are provided with line selection circuits (SELA, SELB, SELL and SELH respectively) which control the connection of the required "register" to the input and output paths of the stack.

The processor module CPU is organised for parallel processing, although for ease of presentation the various data paths have been shown as a single lead in FIGS. 2*a* and 2*b*. The processor module is provided with a so-called main highway MHW, a store input highway SIH and a store output highway SOH. Each of these highways is typically of 24 bits corresponding to the memory word size.

Associated with the various highways are a number of micro-program signal controlled AND gates such as G6 (i.e., those gates which include a number 2 inside them). It must be realised that each gate in practice will consist of 24 gates one for each lead in the 24 bit highway and these gates are activated under micro-program control to allow the data on the various highways to be written into selected registers as required. AND gating, such as gate G3, is also provided on the output of the registers and register stacks allowing selective connection of the various registers to the arithmetic unit MILL. Also shown in FIGS. 2*a* and 2*b* are a number of OR gates (i.e., those gates which include a number 1 inside them) these simply being used for isolation purposes allowing two or more signal paths to be ORed into one input path.

Accumulator stack ACC STK

Figure 3:
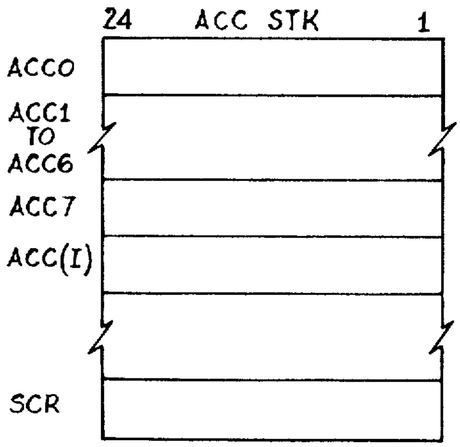
FIG. 3 shows the lay-out of a so-called accumulator stack of the processor module of FIG. 2.

This scratch-pad unit is used to provide a number of accumulator registers (ACC0–ACC7 which may also be used as mask registers or modifier registers) and the required one of these registers may be selected either by micro-program control signals or by instruction word control field bit control signals. Also included in the accumulator stack ACC STK is the sequence control register (SCR) together with additional registers, only one [ACC(I)] of which is shown in FIG. 3. Register ACC(I) is used to store the primary machine working indicators when a fault interrupt occurs. The required register for any operation is selected by passing a selection code to the scratch-pad unit selection circuit SELA in FIG. 2*a*.

Historic register stack HIS STK

This scratch-pad unit is used to store (i) the current sequence control register absolute value, (ii) the current instruction word for all program steps (instructions) and (iii) the memory operand absolute address on store access instructions. The stack consists of 16, 24-bit registers, addressed sequentially by a 4-bit selection register SELH, and constituted as a first-in-first-out circular queue. The historic registers therefore provide a record of the more recently executed program steps and this information may be used in a fault handler program to ascertain the reasons for fault.

Base register stack BASE STK

Figure 4:
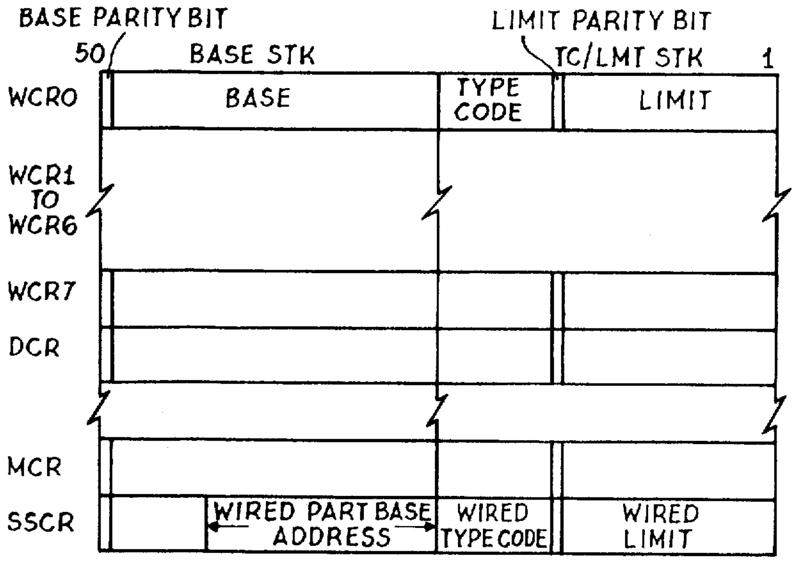
FIG. 4 shows the lay-out of so-called capability register stacks within the processor module of FIG. 2.

This scratch-pad unit is used to provide a number of "half" capability registers for the CPU. It was stated above that the memory protection system incorporates a number of so-called capability registers each of which holds a segment descriptor consisting of a base address, a limit address and a permitted access type code. The base register stack holds the base addresses for all the capability registers. FIG. 4 on the left-hand side shows the "half" capability registers held in this stack and they consist of eight so-called "work-space capability" registers WCRO to WCR7 and a number of so-called hidden capability registers. Only two of the "hidden capability" registers are shown (DCR and MCR) in FIG. 4 as these are the only registers which are of importance in the understanding of the invention. The "work-space capability" registers are selectable by selection codes in the machine instruction register IR and by microprogram control signals while the hidden capability registers are only selectable by special instruction word control codes and by micro-program generated selection codes.

The "workspace capability" registers are used to hold segment descriptors which define some of the working areas of the memory to which the current processor module requires access. One or more of the workspace capability registers is used to hold a segment descriptor which is defined as a "reserved segment pointer table" and by convention the main table for the current program is defined by WCR7.

Appended to the bottom of the capability register stack of FIG. 4 is a register SSCR and this equates to the special block capability register SSCR shown in FIG. 2*a*. This register is used, when a fault interrupt sequence is started, to derive the information for restricting the processor module's memory access area. Capability register DCR is the dump area capability register defining the segment into which the parameters of the currently running program are to be dumped when a change process operation is to be performed. Capability register MCR defines the memory segment in which the master capability table resides and will be filled by the descriptor for the special capability table when a fault interrupt occurs.

Each base of a capability register indicates (a) the store module (e.g., most significant 8 bits) in which the segment resides and (b) the base or start address of that segment within the storage module and has appended thereto a parity bit for the full base address.

Type code/limit stack TC/LMT STK

This stack provides the other "half" of the capability registers and it is shown on the right-hand side of FIG. 4. Each capability register is formed by a corresponding line in both the base and limit stacks. The limit address defines the last address of the segment and has appended thereto a parity bit for that limit address only. The type code is not provided with a parity bit nor does it have any relevance to the parity bits of the base and limit addresses.

Result register RES REG

This register, which is 24 bits long, is fed from the main highway MHW and may be used to temporarily store data for example the result of an arithmetic process.

Operand register OPREG

This register, which is 24 bits long, may be fed from either the main highway MHW or the memory output highway SOH and it is used to receive an instruction word and as an intermediate register in the formation of a store access address.

Instruction register IR

This register is used to hold the control bit fields of an instruction word and applies these to the micro-program control. However it plays no part in the operation of the present invention and is therefore not considered further in this description.

Micro-program unit $\mu$PROG

This unit controls the sequencing of the performance of the operations of the processor module by the issuance of timed and sequenced control signals ($\mu$PGCS) to control (i) the various input and output gates of the registers, (ii) the arithmetic unit MILL (leads AU$\mu$S), (iii) the comparator COMP (leads C$\mu$S), (iv) the fault bits of the primary indicator register MIP (leads FIS) and (v) the condition bits of the secondary indicator register MIS (leads SI$\mu$CS). The micro-program unit is also able (i) to select various registers over leads RSEL and CRSEL, (ii) to control the stepping of the historic register address selector (lead INC), (iii) to increment the contents of the memory input register SDIREG (lead +1S) and (iv) to generate the control codes on the memory access control signal highway SIHCS in accordance with the accessed segment descriptor type code. Various control and condition signals are fed to the unit indicative of the various conditions and indications which are active in the processor module at any one time. These signals are shown as (a) leads AUCS, the condition signals from the arithmetic unit MILL, (b) leads ICS, the indication signals from the primary and secondary indicator registers MIP and MIS, (c) leads PCS, the condition signals from the parity generator and checking circuit PGC and (d) leads CIS, the condition signals from the comparator COMP. Conveniently the micro-program unit may be of any well-known type for example using read-only memories of the self addressed type.

Arithmetic unit MILL

This unit is a conventional arithmetic unit capable of performing parallel arithmetic on the data words presented over its two input ports. Its result is connected over the main highway MHW to the micro-program defined destination. The actual operations performed by the MILL are defined by the arithmetic unit micro-program control signals Au$\mu$S.

Comparator COMP

This unit is used to compare the address loaded into the memory data input registers SDIREG and the access operations required with the bounds (i.e., base and limit) and permitted access code of the segment descriptor relevant to the memory access. Its condition indicating output signals CIS are fed to the micro-program unit $\mu$PROG and control the state of some of the primary indicators. The comparator also is arranged to check the parity of the base and limit addresses each time they are used and the significance of the comparators functions will be evident later.

Memory data input register SDIREG

This register acts as the "CPU to memory" output register and the memory address and memory write data for passage to the memory is assembled in this register prior to its passage to the memory over the memory input highway SIH. This register is provided with an "increment by one" facility controlled by lead +1S which is under micro-program control.

Parity generator and checking circuit PGC

This circuit is used to check the parity bit (lead SPB) received on the memory output control highway SOHCS accompanying a read data word with locally generated parity from the data on highway SOH and the data set into the operand register OPREG. In addition this circuit checks the locally generated parity of the address or data in the memory input register SDIREG against the condition of a parity check wire PCW included in highway SOHCS. The parity check wire PCW is used to return to the processor module the parity of the memory received address or data generated by that processor module. The results of the various parity checks are communicated to the micro-program unit over leads PCS. The store parity bit wire SPB is subjected to the actions of a switchable inversion circuit IP and the relevance of this arrangement will be seen later.

Machine indicator register MIP

Register MIP is used to store the so-called primary indicators whereas register MIS stores the so-called secondary indicators. The following table shows a typical list of primary indicators stored in register MIP. The table is not intended to be exhaustive of all the types of fault condition detection arrangements available and is typical only by way of example.

| Bit No. | Indicator name | Function |
|---|---|---|
| 0 | Mill equals zero | Arithmetic indicators. |
| 1 | Mill greater than zero | |
| 2 | Mill overflow | |
| 3 | | |
| 4 | | |
| 5 | Access field violation | Fault indicators. |
| 6 | Capability parity fault | |
| 7 | Capability base/limit violation | |
| 8 | Capability sum-check fault | |
| 9 | Store interface time-out | |
| 10 | Parity comparison fault | |
| 11 | Read data parity fault | |
| 12 | Invalid operation | |
| 13 | Power failure | |
| 14 | Invalid store control signal | |
| 15 | | |
| 16 | | |
| 17 | | |
| 18 | | |
| 19 | | |
| 20 | Address of capability register | Register identity indicators. |
| 21 | | |
| 22 | | |
| 23 | | |

a. Arithmetic indicators

These indicators are self explanatory being set in accordance with the state of detection arrangements built into the MILL.

b. Fault indicators

These indicators are set as a result of fault conditions occurring and being detected by the processor module. Consideration will be given to each indicator in turn.

i. Bit 5 — Access field violation. This bit is set by an output condition from the comparator COMP when the memory operation required, as defined by coding on a set of three wires in highway SOHCS, forming so-called control wires, does not correspond with the operations permitted by the segment descriptor type code. The three control wires may be coded so that code 001 specifies Read; 010 specifies Read and hold; 100 specifies write and 111 specifies reset. It will be noted that the above codes are such that a single bit error will be detected at the memory as an invalid pattern. The type code of a capability, arranged as the most significant 8 bits of the limit half of the capability register is linearly coded so that bit 16 specifies Read data; bit 17 specifies write data; bit 18 specifies execute data; bit 19 specifies read capability; bit 20 specifies write capability and bit 21 specifies enter capability, bits 22 and 23 being spare. It will be seen that a program's information is partitioned into two types: data and capability pointers. Blocks of data may contain either program instruction (type code with bit 18 set), data constants (bit 16 set), or variables (bit 17 set). Blocks of capability pointers are used during the loading of capability registers (bit 19 set), during the storing of capability pointers (bit 20 set) or to read other programs capability pointers (bit 21 set). From the above it can be seen that if a program having a capability only to read a particular segment tries to say write to that segment the write code 100 on the control wires of SOHCS will be incompatible with the set condition of bit 16 of the type code for that segment descriptor and this will result in Bit 5 of the indicator register MIP being set by comparator COMP.

(ii). Bit 6 — Capability parity fault. As previously mentioned the base and limit addresses stored in the capability registers have appended thereto the parity bits received gy the processor module when these addresses are extracted from the master capability table and passed over the memory/processor module interface. Each time a base address or a limit address is used in the processor module the comparator COMP computes the parity bit for that address and compares it with that stored with the particular address. This arrangement keeps a permanent check against one bit failures of the segment descriptor addresses while they are in the processor module's capability registers. If the parity bits do not agree Bit 6 of the primary indicator register MIP is set by an output from the comparator.

iii. Bit 7 — Capability base/limit violation. As mentioned previously each memory access involves the use of a capability register and the computed memory absolute address (e.g., base address plus instruction word defined address) is checked against the base and limit values of the segment required. This operation is again performed by the comparator COMP and, if the computed absolute address lies outside the limits of the segment descriptor, Bit 7 of the primary indicator register MIP is set.

iv. Bit 8 — Capability sum-check fault. In copending U.S. Pat. application Ser. No. 146,334 filed May 24, 1971 it is shown that each master capability table entry comprises three store words (i) sum-check (ii) base address (iii) limit address. The first word is a computed sum of the second two words and this is used to ensure that the capability registers are loaded correctly. When a load capability register instruction is performed the first word is internally stored and compared with a locally generated sum-check word computed from the base and limit addresses loaded into the particular capability register. If the locally generated sum-check and the master capability table sum-check do not equate the MILL will produce a "MILL greater than zero" condition which, under micro-program control using one of leads FIS, is used to set Bit 8 of the primary indicator register MIP.

v. Bit 9 — Store interface time-out. This bit of the primary indicator register MIP will be set, by micro-program control using one of leads FIS, if a predetermined time elapses between the presentation of a data or address word by the processor module to the memory and a response from the memory. Typically the micro-program control unit may include a counter arranged to count up to say 20 μSeconds and this counter will be started when the address or data word in the memory input register SDIREG is presented to the highway SIH. The return of information on the store output control highway SOHCS will stop the counter. However if the full state of count is reached before the return of information is experienced Bit 9 of register MIP will be set.

vi. Bit 10 — Parity comparison fault. This bit will be set using one of leads FIS under micro-program control if the parity generated at the memory on address or write data words and returned over the "return parity" lead of highway SOHCS does not equate to the locally generated parity, in parity generator PGC, of the address or data word formed in register SDIREG.

vii. Bit 11 — Read data parity fault. This bit will be set using one of leads FIS under micro-program control if the data received over highway SOH and written into the operand register does not have the same locally generated parity, in parity generator PGC, as that indicated by the "parity" wire of highway SOHCS.

viii. Bit 12 — Invalid operation. This bit will be set under micro-program control using one of leads FIS if the function code fed into the instruction register IR when presented to the micro-program control μPROG is found by that equipment to be an invalid instruction.

ix. Bit 13 — Power failure. This bit will be set when it is detected that the power supply margins have been exceeded.

x. Bit 14 — Invalid store control signal. This bit will be set under micro-program control using one of leads FIS in response to an indication over the highway SOHCS from the memory that the control code presented to the memory over highway SIHCS is invalid. It will be recalled that three wires are used for the control code and the coding is arranged such that one bit errors in this part of the control highway will produce an invalid memory operation code.

c. Register fault identity indicators

Bits 20 to 23 of register MIP will be conditioned by leads FIS under micro-program control to define, on one-out-of-16 form, the identity of the capability register in use when one of the fault indicator bits 5, 6, 7 or 8 are set. The address code will be generated by the micro-program control.

Machine indicator register MIS

Register MIS stores a number of indicators required for use internally by the micro-program control operative over leads SIμCS. Only five of these indicators are of significance to the present invention. These indicators are (i) a first attempt indicator (ii) a fault administrative indicator (iii) a second fault indicator (iv) a common fault indicator and (v) an internal parity indicator. The significance of these indicators will be seen from the following description of the operation of the processor module when a fault interrupt occurs.

FAULT INTERRUPT OPERATION

The sequences of operation performed by the processor module when a fault indicator is set will now be described with reference to FIGG. 2*a* and 2*b* together with FIG. 5.

Figure 5:
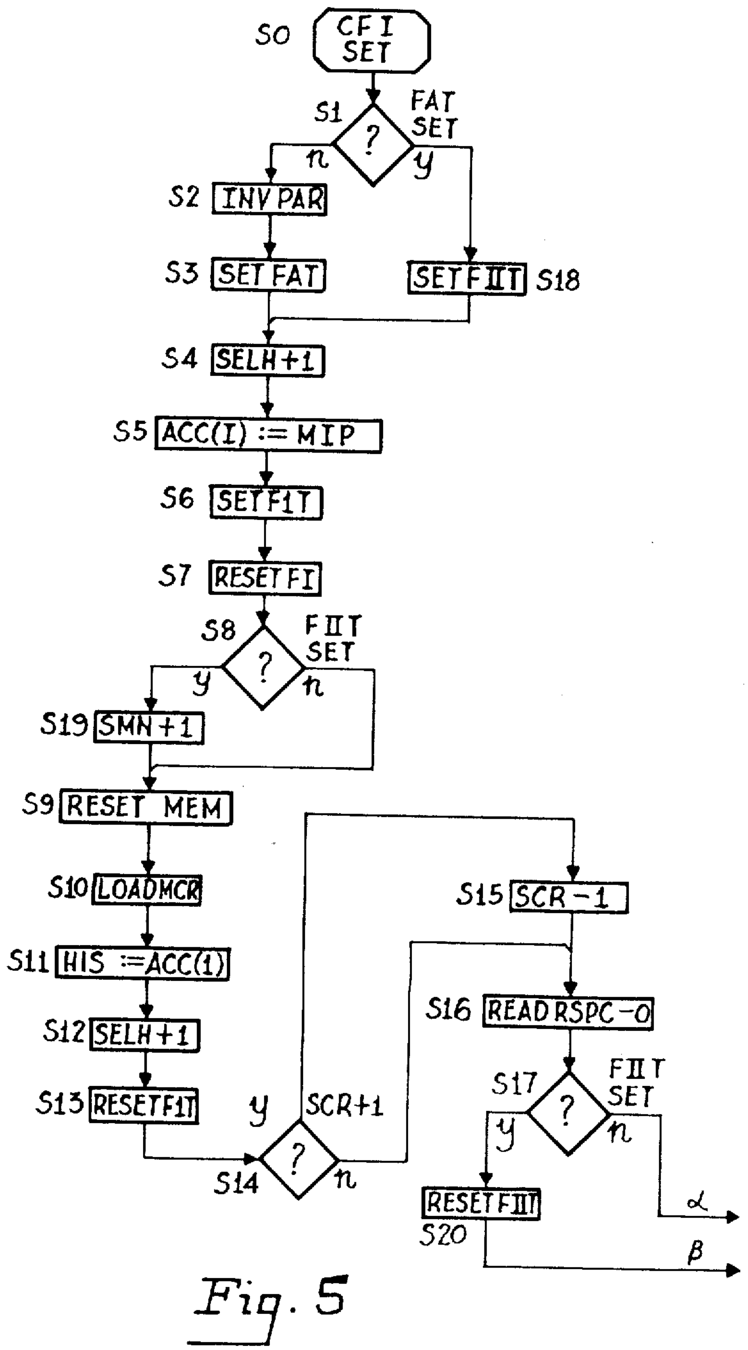

Step SO (CFI SET) of FIG. 5 is the entry step into the fault interrupt micro-program and it indicates that the common fault indicator (CFI) in the secondary indicator register MIS (FIG. 2*a*) has been set and its set state has been communicated, over the relevant one of leads ICS to the micro-program control unit μPROG. The setting of any of bits 5 to 14 of the primary indicator register MIP causes the common fault indicator of register MIS to be set over lead F. Regardless of all other current conditions the activation of the common fault indicator causes the fault interrupt micro-program to be commenced.

The following description will be sectionalised under the steps of FIG. 5 however, many and frquency references to other figures of the drawings will be made.

S1 — F.A.T. Set

The micro-program control μPROG tests the state of the first attempt indicator (F.A.T.) in the secondary indicator register MIS (by interrogation of the relevant ICS lead) to see if it is set.

It will be assumed that the first attempt indicator is not set at this stage indicating that this is the first entry into the fault interrupt micro-sequence for the current fault condition and the relevance of this test will be seen later.

S2 — INV PAR

The micro-program control μPROG, in this step, changes the state of the internal parity indicator in the secondary indicator register MIS. This indicator is used to generate conditions on leads PS to control the parity bit inversion circuit IP and to provide parity state indication signals (i.e., "odd" or "even" parity) to the parity checking and generator circuit PGC and the comparator COMP. The data processing system may for example be organised on an "odd parity" basis so that odd parity is stored in the storage equipments and is passed to the processor modules when data is read. The processor modules, however, may be arranged to function internally using either odd or even parity dependant upon the state of the internal parity indicator. Each time a fault interrupt occurs, with the first attempt indicator in the reset state, the state of the internal parity indicator is inverted. Hence all the data currently resident in the processor module at this stage will be adjudged, if used erroneously, to have bad parity. This has particular significance with respect to the capability registers as the stored parity bits for the base and limit addresses of each loaded capability register will now be invalidated. This arrangement ensures that the program currently being performed cannot be corrupted by the faulty processor as any attempt to use the currently loaded capability registers after the fault condition has been detected will result in a capability register parity fault condition.

S3 — Set F.A.T.

The micro-program control, in this step, sets the first attempt indicator (F.A.T.) to indicate that this current entry into the fault interrupt sequence is the first due to the current fault condition. The relevant one of leads SIμCS will be activated to set the first attempt indicator in register MIS. The first attempt indicator when set is arranged to inhibit the processor module's interrupt system and the processor module is therefore confined to the fault check-out procedure. The first attempt indicator is reset by program instruction towards the end of the fault check-out program.

S4 — SELH + 1

The micro-program control increments (by activating lead INC) the address pointer on the historic registers stack HIS STK in this step ready for later use.

S5 — ACC(I): = MIP

The micro-program control causes the primary machine indicators in register MIP to be copied into the indicators accumulator ACC(I). It should be noted that the symbol (:=) shown in step S4 of FIG. 5 is to be read as "becomes." The operations of this step are performed by (i) selecting ACC(I) by use of leads RSEL (ii) opening gate G1 and (iii) opening gate G2. This allows the contents of register MIP to be applied over highway MHW to the selected accumulator ACC(I).

S6 — Set FIT

The micro-program control μPROG, using the relevant one of leads SIμCS, sets the fault administration indicator (FIT) at this stage. This indicator is used to protect the record of the conditions of the fault indicators in the indicators accumulator ACC(I) should a second fault occur before these indicators states have been written into the historic registers. Although not shown of FIG. 5 for sake of simplicity this indicator (FIT) is arranged to by-pass steps S4 and S5 if the fault interrupt micro-sequence is entered with FIT set.

S7 — Reset FI

The micro-program control μPROG resets the set fault indicator in the primary indicator register MIP and the common fault indicator (CFI) in the secondary indicator register MIS in this step using the relevant one of leads SiμCS.

S8 — FIIT Set ?

The micro-program control μPROG tests the state of the second fault indicator (FIIT) in the secondary indicator register MIS, using the relevant one of leads ICS, in this step. It will be assumed that the second fault indicator is not set at this stage as this is the first entry into the fault interrupt micro-sequence.

S9 — Reset MEM

The micro-program control μPROG causes the all 1's code to be applied to the control wires of the memory input control highway SIHCS in this step if the fault has occurred during the addressing of the memory. This has the effect of releasing the memory for use by other processor modules.

S10 — Load MCR

The micro-program control μPROG causes the master capability register MCR (of FIG. 4) to be loaded with the special capability table segment descriptor for this processor module. The functions performed in this step are somewhat complex and reference will not only be made to FIGS. 2a and 2b but also to FIG. 6.

Figure 6:
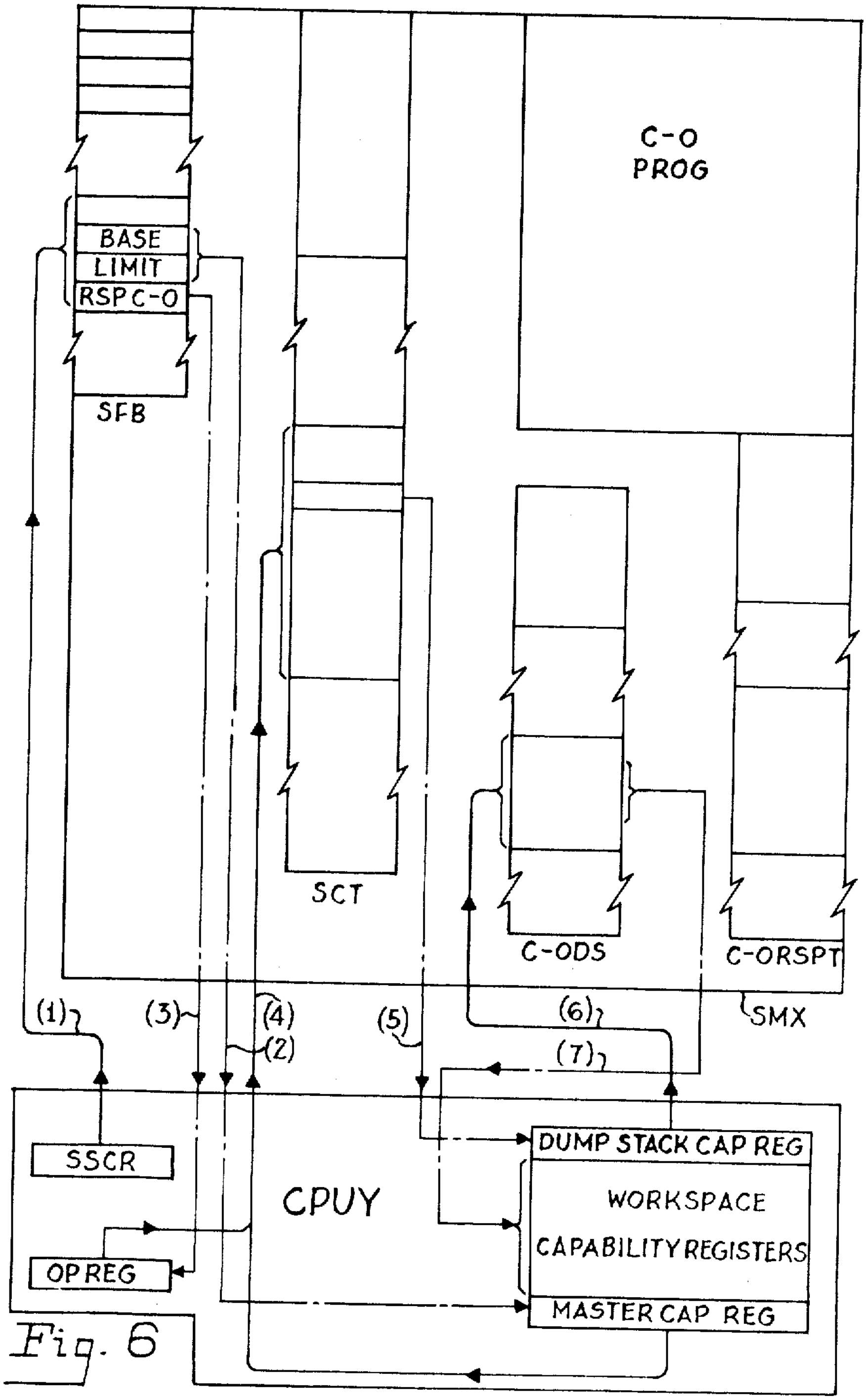
FIG. 6 shows in block form particular data segments of the memory of the data processing system of FIG. 1.

FIG. 6 shows, in very brief outline one processor module CPUY and one storage module SMX. The registers shown in the processor module of FIG. 6 have been skeletonised as this drawing is to be interpreted as explanatory only of the various functions performed in the fault interrupt micro-sequence. The "workspace capability registers" WCRO-7 (FIG. 4) are shown in FIG. 6 as one block and only the "DUMP STACK CAP. REG" and the "MASTER CAP REG" of the hidden capability registers is shown. The special capability register SSCR and the operand register OPREG are the only other two registers shown in FIG. 6. It was mentioned previously that some of the storage modules in the memory are provided with a fault block which has special information for each processor module in the system. The fault block is represented at SFB in FIG. 6 and this consists of N four-word areas where N is equal to the number of processor modules. Only two such areas are shown in FIG. 6 and the area relevant to processor module CPUY is shown "pointed" to by the special capability register SSCR in that module over path (1). Each area in the fault block SFB consists of (i) a sum-check word (ii) a base address BASE (iii) a limit address LIMIT and (iv) a pointer word RSPC-O. A number of other segments are shown in FIG. 6 in the storage module SMX and these will be used later in the description and briefly they are (i) a block of special capability tables SCT one for each processor module (ii) a block of check-out program dump stacks C-ODS, one for each processor module (iii) a block of check-out program segment pointer tables C-ORSPT one for each processor module and (iv) a block of segments storing the information for the check-out program C-OPROG.

Considering now the actions of the micro-program control μPROG (FIG. 2) in the performance of the current step of the fault interrupt micro-sequence. The first operation is to address the storage module SMX (of FIG. 6) with the start address of the area particular to processor module CPUY in the fault block SFB.

S10*a* — Access first word of area in SFB

This operation is performed by activating gates G3, G4 and G6 in FIGS. 2a and 2b. The activation of gate G3 causes the base address contents of the special capability register SSCR to be fed via the arithmetic unit MILL and the highway MHW into the memory input register SDIREG. The special capability register SSCR is divided into two sections. The first section is conditioned by a "hard-wired" strapping field SF arranged to permanently code that section with the first address of the area in the fault block of each storage module. The second section is alterable and is arranged to be reset to all zeros at this stage indicating, it will be assumed the storage module address of storage module SMX in FIG. 6. Hence when gate G5 (in FIG. 2b) is opened the memory input highway SIH will carry the first address of the area applicable to processor module CPUY in the special fault block SFB (FIG. 6). At the same time the micro-program control conditions the code wires of memory input control signal highway SIHCS (FIG. 2b) to indicate a read operation to the memory. Path (1) shown in FIG. 6 is, therefore, activated, and the first word of the processor module's area in block SFB will be read out and returned to the processor over the memory output highway SOH (FIG. 2b).

S10*b* — Input first word from area in SFB

This word is in fact the sum-check word for the special capability table segment descriptor and its arrival at the processor module will be indicated to the micro-program control μPROG by the control signal highway SOHCS. The micro-program control thereupon opens gates GS and G6 causing the sum-check word to be written into the operand register OP REG. While this operation is being performed the parity generator and checking circuit PGC will check the parity of the incoming word and the data in the operand register against the store parity bit condition on lead SPB. If no parity failures are detected the seond word from the area in SFB will be addressed.

S10*c* — Access second word in area in SFB

In this sub-step the micro-program control activates lead +1S to increment the address word in register SDIREG, opens gate G5 and conditions the code wires of the memory input control signal highway SIHCS to define a read operation.

The second word in the special capability register defined area in the fault block SFB (FIG. 6) is the base address BASE of the special capability table segment descriptor and when this information is read it is passed to the processor, over path (2) of FIG. 6, for application to the "base half" of master capability register MCR.

S10*d* — Input second word from area in SFB

The micro-program control μPROG (FIG. 2) upon reception of the control signals on the memory output control signal highway SOHCS opens gates GS, G7 and G8 after selecting over leads CRSEL the base half of the master capability register in BASE STK. This causes the memory output on highway SOH to be written into the base half of the master capability register together with the condition of the parity bit for that word on lead SPB.

S10*e* — Access third word in area in SFB

The micro-program control μPROG now activates lead +1S to increment by one the address word in register SDIREG, opens gate G5 and conditions the code wires of highway SIHCS to define a read operation.

The third word in the special capability register defined area in the fault block SFB (FIG. 6) is the limit address LIMIT of the special capability table segment descriptor and when this information is read it is passed to the processor, using path (2) of FIG. 6 for application to be "limit half" of the master capability register.

S10*f* — Input third word of area in SFB

The micro-program control when conditioned by highway SOHCS (FIG. 2) causes the CRSEL leads to be activated to select the master capability register and gates GS, G9 and G10 to be opened. This causes the limit address, together with its parity bit, to be fed into the relevant "line" of the limit stack LMT STK.

S10*g* — Check capability register loading

The micro-program control now tests the loaded master capability register to ensure that it has been correctly loaded. This sub-step is performed in two halves. Firstly a local sum-check is formed by activating leads CRSEL (FIG. 2a) with the identity of the master capability register, by opening gates G11, G12 and G13 and by instructing the arithmetic unit MILL to add the data words applied. It will be seen that the above operations cause the locally generated sum-check to be places in the result register RES REG. At the same time the parity of the base and limit addresses are checked in the comparator COMP.

The second half of this sub-step, causes the locally generated sum-check, in the result register, to be compared with the work in the operand register OPREG. This is performed by opening gates G14 and G15 and instructing the arithmetic unit MILL, over the appropriate leads AUμS, to perform a substraction operation and to set the arithmetic indicators in the primary indicator register MIP to the result derived. The micro-program control μPROG now tests the states of the arithmetic indicators, using the relevant ones of leads ICS to see if the two sum-check words are identical. Assuming that they are identical the fault interrupt sequence steps on to step S11.

S11 — ACC(I)

In this step the micro-program control μPROG activates leads RSEL to define the indicators accumulator ACC(I) in the register stack ACC STK and then activates gates G16, G17 and G18. This causes the primary indicators placed in the indicators accumulator in step S4 to be passed, via the arithmetic unit MILL, the highway MHW and the operand register OPREG, to the next line (as defined by step S3) of the historic register stack HIS STK. This operation ensures that the primary indicators are stored in the historic registers immediately following the last s.c.r., instruction word and, if applicable, absolute memory address information block entry therein.

S12 — SELH+1

The micro-program control μPROG, by activating lead INT, causes the historic registers address pointer to be stepped on by one.

S13 — Reset F1T

The micro-program control μPROG, in the step resets the fault administration toggle F1T as the primary indicators as set by the original fault have now been stored in the historic registers.

S14 — SCR+1 ?

In this step one of the secondary indicators will be tested to see if the point at which the fault occurred in the current instruction was after the stage at which the sequence control register was incremented to point to the next instruction of the current program. If this had already happened step S15 is performed to reduce the sequence control register value back to that of the current instruction. If this point has not been reached step S16 is performed directly.

S16 — Read RSPC-O

In this step the fourth word in the processor module's area in the fault block SFB (FIG. 6) is read and the reserved segment pointer in that word will be passed over path (3) of FIG. 6 and stored in the processor module's operand register. This pointer, which is relative to the special capability table, defines a dump stack relevant to the processor module and the check-out program. The operations performed by the processor module, under micro-program control μPROG (FIG. 2) are in two sections. The first causes the memory to be addressed for a read operation while the second causes the memory produced data to be fed into the operand register OPREG. The first operation is performed by micro-program control activation of lead +1S, gate G5 and the conditioning of the appropriate control wires of highway SIHCS. It will be recalled that prior to this step, indeed since the end of step S9, register SDIREG has been holding the address of the third word in the processor module's area in block SFB of FIG. 6. Hence the address applied in this step to the memory will be that of the fourth word of that area.

When the memory produces the word RSPC-O it will be fed to the processor module on leads SOH (FIG. 2b) and the control signal highway SOHCS will indicate its presence to the micro-program control μPROG. Gates GS and G17 are therefore opened and the incoming data word (RSPC-O) is fed into the operand register OPREG. Concurrent with this operation the parity generator and checking circuit PCG checks the parity of the received data word and that of the work placed in the operand register.

S17 — FIIT Set ?

In this step the micro-program control μPROG tests the relevant one of leads ICS to see if the second fault indicator in the secondary indicator register MIS is set. This indicator will only be set at this stage if this is the second pass through the fault interrupt micro-sequence. As the above description relates to the first pass through the micro-sequence the sequence will be ended at point α.

In actuality the processor module is now arranged to perform a so-called automatic change process instruction. At this stage the processor module has suspended the performance of the program (process) it was performing prior to the generation of the fault interrupt signal (by the common fault indicator in the secondary indicator register) and it is now necessary to preserve in the memory the parameters of the suspended process and to extract from the memory the parameters of the fault check-out program.

It was mentioned previously that each program is provided with a so-called dump area segment pointed to by the contents of the dump capability register DCR (FIG. 4). Each dump area segment contains information about the state of the associated process, such as the values of the reserved segment pointers corresponding to each of the work-space capability registers of the processor module when running that process. These locations are loaded with the corresponding RS pointer whenever a capability register is loaded as shown in our copending U.S. Pat. application Ser. No. 146,334, filed May 24, 1971. However, the dump area segment is also used to store the contents of the registers of the ACC STK including the current value of the sequence control register and the state of the primary indicators, when the process is suspended. Hence the exit from FIG. 5 by path α is to an automatic "change process" operation causing the contents of the accumulator stack ACC STK to be dumped into the area defined by the dump stack capability register DCR. It will be recalled that at this stage all the capability registers, with the exception of the master capability register MCR (FIG. 4) are still holding the segment descriptors relevant to the process being performed when the fault condition occurred. The actual operations performed in the processor module of FIG. 2 require: (1) the forming of the first dump area address by selecting (over leads CRSEL) the DCR base address and accessing the memory (by opening gates G11, G4 and G5) for a write operation at the dump area, the dump area address is also saved, in the result register RES REG (by opening gates G13 at the same time as gates G4) for successive dump area accesses and (2) the passage of the relevant register contents (selected by RSEL and passed over gates G16, G4 and G5) of each relevant entry in the ACC STK with the up-dating of the access address (by opening gates G14 and G13 with G4 and instructing the MILL to perform an add 1 operation). The above (1) and (2) referenced operations are repeated for all the ACC STK entries required. It should be noted that step S2 of FIG. 5 invalidated the parity on all the capability registers loaded at that time and the sequencing of the automatic change process operation is arranged to take this situation into account allowing the dump stack capability register to be validly used.

In a normal "change process" instruction sequence the processor module will be provided, in the corresponding instruction word, with the offset down a reserved segment pointer table which is used to access the master capability table to obtain the dump area segment for the process (program) to which the change is to be made. However in the current situation the change process sequence is automatic (i.e., as a result of the common fault indicator being set) and consequently the dump area segment for the check-out program must be obtained in a different manner.

It will be recalled that step S16 of FIG. 5 performed the extraction of an R.S. pointer (RSPC-O) from the last word in the processor module's area in the fault block of storage module SMX (FIG. 6). This pointer is arranged to define an offset down the processor module's special capability table, stored in block SCT, at which the segment descriptor for the check-out dump area particular to this processor is held in moduel SMX. Hence the required dump area segment descriptor can be extracted from the special capability table using a normal load capability register operation using the operand register OPREG contents as the special capabilty table offset. Path (4) and path (5) of FIG. 6 show this operation in outline form.

Having loaded the dump stack capability register with the required dump area segment descriptor the various parameters of the fault check-out program may now be extracted from the check-out program's dump area particular to the processor module in block C-ODS and loaded into the processor module usuing path (6) and (7) allowing the check-out program to be entered.

It will be seen from FIG. 6 that storage module SMX is provided with five storage areas which are relevant to the fault interrupt micro-sequence, and four of these are provided on a per processor module basis. As already mentioned the fault block SFB has a number of areas one for each processor module of the system. Similarly the special capability table block SCT, the check-out process dump area block C-ODS and the check-out process reserved segment pointer table block C-ORSPT, have a corresponding area for each processor module. The actual check-out program code, together with some work-space areas and the like operated in read-only mode ma be common to all the processors or if storage space allows may be individual thereto. Additionally in the overall modular system a number of storage modules are arranged to carry similar blocks to that shown in FIG. 6.

SECOND FAULTS

The fault check-out program (operated in read-only mode) is arranged to test the various functions of the processor module and to activate one of the fault indicators if a faulty operation is encountered. Additionally the various checks which are performed in the operation of the processor module are similarly performed in the fault interrupt micro-sequence. For example in step S10 of FIG. 5 the incoming data is checked for parity and the master capability register after being loaded is checked using the sum-check words. Hence if the processor module fails for a second time the fault interrupt micro-sequence of FIG. 5 will be re-entered this time however with the first attempt indicator (F.A.T.) set.

Referring again to FIG. 5 the second entry into the fault interrupt micro-sequence (by the setting of the common fault indicator CFI of the secondary indicators) causes step S1 to be performed. This time, however, the first attempt indicator will be set causing step S18 to be performed. It should be noted that step S2 will not be performed under these circumstances maintaining the inverted state of parity in the processor module.

S18 — Set FIIT

This step causes the second fault indicator (FIIT) in the secondary indicator register MIS (FIG. 2*a*) to be set by the activation of the appropriate lead of leads Si$\mu$CS under micro-program control. Steps S4, S5, S6, S7 and S8 (of FIG. 5) are now performed with the same effects as described above. Step S8, however, will produce a "yes" result causing the performance of step S19.

S19 — SMN+1

The micro-program control $\mu$PROG causes the store module number part of the base address of the special capability register SSCR to be incremented in this step. This operation is performed by opening gates G3 and G19 and by instructing the MILL to add one to the store module address field of the address word. Steps S9 to S16 are now performed, however, as the store module number of the base address in special capability register SSCR has been incremented the operations of these steps although identical will involve the use of another store module to that used in the first pass through the micro-sequence.

Additionally step S17 will produce a "yes" result which causes the micro-sequence to be exited by way of path $\beta$ after the reset of the second fault indicator in step S20. This latter path $\beta$ is an entry into the automatic change process operation described above, however, it is arranged to be part-way through that process as there is no point in dumping the suspended processes parameters for a second time. It will also be realised that step S11 will cause the primary indicators, holding information on the second fault to be placed below the first fault primary indicators state in the historic registers.

By the above re-entry mechanism a faulty processor may be trapped either in the fault interrupt micro-sequence or in the check-out program sequentially using each storage module in turn in which the check-out program has an appearance. Each time a fault occurs the primary indicators will be written into the next location in the historic register stack. Alternatively if the first fault was due to a faulure in the storage module SMX of FIG. 6 the re-entry mechanism will cause another storage module to be used and the check-out program will then probably be correctly obeyed by the processor module.

Typically the check-out program may be written for operation in read only mode and so that all the functions of a processor module and a storage module are tested and if it is completed correctly the processor module may than apply to the on-line system to enter a "rejoin" process allowing it to return to the on-line system after re-setting the first attempt indicator. Throughout the performance of the fault check-out program the first attempt indicator (F.A.T.) remains set and the fault check-out program itself is arranged to reset this indicator when it is complete. This ensures that the fault check-out program cannot be interrupted as the F.A.T. indicator as mentioned previously inhibits the processor module's normal interrupt mechanism. Typically if the processor module uses an interrupt system of the type described in co-pending U.S. Pat. application Ser. No. 176,464, now U.S. Pat. No. 3,757,307 the set state of the first attempt indicator may be used to inhibit the interrupt clock pulse source. The on-line system may be informed of the results of check-out by using so-called "status words" and a request to rejoin the system may be communicated to the other processor modules of the system by way of the normal interrupt mechanism.

CONCLUSIONS

From the above it can be deduced that the fault interrupt mechanism provided by the invention causes the processor module experiencing a fault condition to immediately invalidate the currently loaded information and to overwrite its master capabilty register contents with a segment descriptor defining a special capability table. The entries in the special capability table are such as to restrict very severely the area in the memory to which that processor is allowed access. Additionally once a processor enters the fault interrupt sequence it cannot be interrupted and it cannot rejoin the on-line system until it has successfully obeyed a check-out program. By the provision of a number of check-out program copies with corresponding access information in a number of storage modules a permanently faulty processor once having experienced a fault interrupt will be harmlessly trapped in the fault check-out routines. It will be appreciated by those skilled in the art that arrangements, such as timing words in the memory which are commonly scanned and individually up-dated by the processor modules of the on-line system, may be provided to allow the on-line system to detect that a faulty processor module has been suspended.

The above description has been of one embodiment only and is not intended to be limiting to the scope of the invention. Alternative arrangements may readily be seen by those skilled in the art. For example the invention has been related to a processor module incorporating a particular type of memory protection system however other types of such protection system may be controlled by the mechanism of the invention. Also the embodiment has been related to a multi or modular processor system, however the basic features of the invention are equally applicable to a single processor system.

What we claim is:

1. A data processing system comprising, in combination, a memory means for providing storage in segmented form for information segments relative to application and supervisory programs and master and special capability tables, together with information segments relative to a fault check-out program; intercommunication means; and at least one processor module coupled through said intercommunication means to said memory means, each processor module cooperating with said memory means and provided with memory protection means comprising, a plurality of capability registers, means for loading said capability registers, each of said registers holding memory segment descriptor information indicative of the base and limit memory addresses of an information segment, a first of said capability registers being adapted to hold a first segment descriptor defining an information segment which contains a master capability table having an entry for each information segment in said memory means, in which is stored the base and limit memory addresses of the corresponding information segment, said master capability table providing the base and limit memory addresses of a descriptor when said loading means effects loading of one of the remaining capability registers, overwriting means for replacing information in said capability registers, and, fault detection and handling means for detecting a fault condition and in response to the fault condition to become immediately operative within the processor module to suspend the processor module from the active processing system by activating said overwriting means for replacing information in the master capability register of said processor module with special descriptor information defining a special capability table having entries for only those information segments in said memory which are relative to said fault check-out program alone to thereby condition said processor module to enter said fault check-out program.

2. A data processing system as claimed in claim 1, wherein said memory means comprises a plurality of storage modules accommodating a plurality of check-out program pointer segments in which the special descriptor information is stored, said check-out program pointer segments being distributed among the storage modules of said memory means on a mutually exclusive basis, said fault detection and handling means including first fault condition detection means for detecting a first fault condition, said memory protection means including check-out program pointer segment addressing means, said first fault condition detection means upon detecting a first fault condition activating said check-out program pointer segment addressing means to read said special descriptor from one of said check-out program pointer segments, said fault detection and handling means further including a further fault detection means for sensing the occurrence of the fault condition while said processor module is suspended from said active processing system and in response to such occurrence conditioning said check-out program pointer segment addressing means to read said special descriptor from another of said check-out program pointer segments.

3. The data processing system as claimed in claim 2, wherein a plurality of copies of the information segments relative to said fault check-out program are provided in said memory means, said copies being distributed among said storage modules, each check-out pointer segment being arranged to hold (i) information relative to the area occupied by a different copy of said fault check-out program, and (ii) a pointer to the segment in which the instructions of said check-out program reside, each of said processor modules including means for loading one of said capability registers with the descriptor stored in the special capability table entry defined by said pointer.

4. The data processing system as claimed in claim 3 in which at least one processor module includes parity bit inversion means which are activated in response to the activation of said first fault condition detection means, to thereby invalidate all information in the processor module which is relative to programs other than said fault check-out programs.

5. A data processing system is claimed in claim 4 in which said first fault detection means includes a two-state switching device adapted to be switched to a first active state by the activation of said first fault condition detection means and to be switched to a second or inactive state in response to a particular instruction in said check-out program.

6. A data processing system as claimed in claim 5, and in which said two-state switching device when in said active state is adapted to cause the contents of a particular register in said check-out program pointer segment addressing means to be modified by a predetermined amount each time said further fault condition detecting means is activated and said particular register is used to hold the address of said memory of the base address of the check-out program pointer segment to be used if a further fault condition is detected.

7. The data processing system as claimed in claim 6 wherein said at least one processor module includes means for replacing said first segment descriptor in said first master capability register upon the successful completion of said fault check-out program.

* * * * *